US012565823B2

(12) United States Patent
Alvarez et al.

(10) Patent No.: US 12,565,823 B2
(45) Date of Patent: Mar. 3, 2026

(54) METHOD AND SYSTEM FOR DETERMINING SHALE ROCK MATURITY USING MICROWAVES

(71) Applicant: ARAMCO SERVICES COMPANY, Houston, TX (US)

(72) Inventors: Jose Oliverio Alvarez, Houston, TX (US); David Joseph Jacobi, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1032 days.

(21) Appl. No.: 17/653,802

(22) Filed: Mar. 7, 2022

(65) Prior Publication Data

US 2023/0279739 A1 Sep. 7, 2023

(51) Int. Cl.
E21B 36/04 (2006.01)
G01N 22/00 (2006.01)

(52) U.S. Cl.
CPC ............. E21B 36/04 (2013.01); G01N 22/00 (2013.01); *E21B 2200/22* (2020.05)

(58) Field of Classification Search
CPC .... E21B 36/04; E21B 2200/22; E21B 49/025; G01N 22/00
See application file for complete search history.

(56) References Cited

U.S. PATENT DOCUMENTS 4,510,437 A 4/1985 Iskander
11,016,075 B2 5/2021 Alvarez et al.

OTHER PUBLICATIONS

Shakib, Jaber Taheri, and Ali Shekarifard. "The Effect of microwave frequency on dielectric properties and Pyrolysis of oil shales." 16th Iranian Geophysics Conference. vol. 3. 2014 (Year: 2014).*
Julian, Ignacio, et al. "Overcoming stability problems in microwave-assisted heterogeneous catalytic processes affected by catalyst coking." Catalysts 9.10 (2019): 867 (Year: 2019).*
Rahman, Rezwanur, John A. Scales, and Manika Prasad. "Complex dielectric properties of organic-rich mudrocks as functions of maturity." arXiv preprint arXiv:1507.07582 (2015) (Year: 2015).*
Shalaby, Mohamed Ragab, et al. "Thermal maturity and TOC prediction using machine learning techniques: case study from the Cretaceous-Paleocene source rock, Taranaki Basin, New Zealand." Journal of Petroleum Exploration and Production Technology 10 (2020): 2175-2193 (Year: 2020).*
Zhu, Jingyi, et al. "The experimental study of microwave heating on the microstructure of oil shale samples." Energy Science & Engineering 7.3 (2019): 809-820 (Year: 2019).*
Abraham, Tinu, et al. "Dielectric relaxation-based capacitive heating of oil sands." Energy & Fuels 30.3 (2016): 1987-1996 (Year: 2016).*

(Continued)

*Primary Examiner* — Saif A Alhija
(74) *Attorney, Agent, or Firm* — Osha Bergman Watanabe & Burton LLP

(57) ABSTRACT

A system for determining shale rock maturity includes a dual mode microwave cavity configured to receive a shale sample, a heating system configured to heat the shale sample to a range of different temperatures using microwave emissions of a first frequency, and a measuring system configured to measure a complex permittivity of the shale sample using a microwave signal of a second frequency.

17 Claims, 5 Drawing Sheets

(56)        References Cited

OTHER PUBLICATIONS

Bhattacharya, Shuvajit. "Summarized applications of machine learning in subsurface geosciences." A Primer on Machine Learning in Subsurface Geosciences. Cham: Springer International Publishing, 2021. 123-165 (Year: 2021).*

C. Sun, et al., "The temperature and mechanical damage investigation of shale with various dielectric properties under microwave irradiation," Journal of Natural Gas Science and Engineering, 2021 (18 pages).

B. Sauerer, et al., "Fast and accurate shale maturity determination by Raman spectroscopy measurement with minimal sample preparation," International Journal of Coal Geology, 2017 (8 pages).

Office Action issued by the Saudi Arabian patent office for corresponding Saudi Arabia patent application No. 123441369, mailed Feb. 16, 2025 (8 pages).

J. Espitalie et al., "Source Rock characterization Method for Petroleum Exploration", OTC 2935, 1977, pp. 439-444 (6 pages).

Catala-Civera et al.; "Dynamic Measurement of Dielectric Properties of Materials at High Temperature During Microwave Heating in a Dual Mode Cylindrical Cavity", IEEE Transactions On Microwave Theory And Techniques; vol. 63; No. 9; Sep. 2015; pp. 2905-2914 (10 pages).

Alvarez et al.; "Dielectric Characterization Of Geochemical Properties Of Crude Oils And Gas Condensate At 25° C."; 2017 IEEE International Geoscience and Remote Sensing Symposium (IGARSS); Jul. 23, 2017; pp. 365-368 (4 pages).

J. O. Alvarez and D. Jacobi; "Nondestructive Microwave Spectroscopy In Calcite-Rich Shale Core Slabs", IGARSS 2020-2020 IEEE International Geoscience and Remote Sensing Symposium; Sep. 26, 2020; pp. 1397-1400 (4 pages).

J. O. Alvarez and J. W. Schultz; "Spot-Probe Reflectometer Measurements of Geological Core Slab Samples", 2018 AMTA Proceedings; Nov. 4, 2018; pp. 1-5 (5 pages).

Lafargue et al.; "Rock-Eval 6 Applications In Hydrocarbon Exploration, Production, And Soil Contamination Studies", Oil & Gas Science and Technology-Revue de I IFP; Jul. 1998; pp. 421-437 (17 pages).

Garcia-Baños et al.; "Temperature Assessment of Microwave-Enhanced Heating Processes", Scientific Reports; vol. 9 ; No. 10809; pp. 1-11 (11 pages).

M. A. Fam and M. B. Dusseault; "Shale Characterization Using Complex Permittivity Measurements", Society of Core Analysts; SCA-9842; 1998; pp. 1-4 (4 pages).

* cited by examiner

METHOD AND SYSTEM FOR DETERMINING SHALE ROCK MATURITY USING MICROWAVES

BACKGROUND

Crude oil and natural gas are formed in source rocks, such as shale rock, which contain a certain quantity of organic matter. Depending on the level of processing of the organic matter contained in the shale rock (e.g., by bacteria, heat, and/or pressure over time) the maturity of the shale rock may differ. The maturity may determine the amount of distillable hydrocarbons.

Maturity and other parameters such as the total organic carbon (TOC) are commonly determined using geochemical analysis in laboratories, after a core sample has been obtained from the subsurface formation that contains the source rock of interest.

Pyrolysis is one such analysis that introduces the sample of rock of known mass, into a sealed oven that is programmed to heat the sample according to a prescribed rate of increasing temperatures. As the combustion of the sample commences, the gases from the sample emitted at different temperatures, are to a detector to measure and record the amount of hydrogen and carbon dioxide as the temperature increases. Different peaks may be detected at different temperatures, and pyrolysis may thus allow the measurement of distillable hydrocarbon (hydrogen peak obtained at lower temperatures), but also the generative potential of the remaining kerogen (hydrogen peak obtained at higher temperatures). A qualitative estimate of the maturity may then be obtained based on a ratio of the distillable hydrocarbon and the generative potential of the remaining kerogen.

Laboratory-based analyses such as pyrolysis may take days to weeks, depending on laboratory availability. Moreover, by the time the samples get to the laboratory, they could be damaged or poorly preserved, thus creating a significant source of uncertainty in the measurements.

In view of the above it would be desirable to determine shale rock parameters on-site, without the need of a laboratory.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a system for determining shale rock maturity, the system comprising a dual mode microwave cavity configured to receive a shale sample; a heating system configured to heat the shale sample to a range of different temperatures using microwave emissions of a first frequency; and a measuring system configured to measure a complex permittivity of the shale sample using a microwave signal of a second frequency.

In general, in one aspect, embodiments relate to a method for determining shale rock maturity, the method comprising: measuring a complex permittivity of a shale sample as a function of temperature; obtaining an imaginary part of the complex permittivity; and determining the shale rock maturity based on a relaxation in the imaginary part.

In general, in one aspect, embodiments relate to a non-transitory machine-readable medium comprising a plurality of machine-readable instructions executed by one or more processors, the plurality of machine-readable instructions causing the one or more processors to perform operations comprising: determining a shale rock maturity of a shale sample based on a relaxation in an imaginary part of a complex permittivity, wherein the complex permittivity of the shale sample is a function of a temperature of the shale sample.

In light of the structure and functions described above, embodiments of the invention may include respective means adapted to carry out various steps and functions defined above in accordance with one or more aspects and any one of the embodiments of one or more aspect described herein.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining shale rock maturity using microwaves.

A shale sample may be obtained from a geological formation, for example, to determine whether the production of hydrocarbons from the geological formation is viable. In one or more embodiments, the shale sample is placed into a microwave cavity. A microwave-based heating system is used to heat the shale sample, while a microwave-based measuring system is used to, simultaneously with the heating, measure the dielectric properties of the shale sample. As a result of the heating, the composition of the shale sample changes, which results in changes of the dielectric properties of the shale sample. The changing dielectric properties in a temperature-dependent manner, captured by the microwave-based measuring system may, thus, be indicative of the maturity and/or other characteristics of the shale sample. The systems and methods as described may provide results that are qualitatively comparable to data obtained using other methods, such as pyrolysis. However, unlike other approaches, methods and systems as described may be used on-site. Accordingly, results may be available more instantaneously. Further, the risk of damaged or deteriorating samples is reduced, thus resulting in more trustworthy results. A detailed description is subsequently provided.

Figure 1:
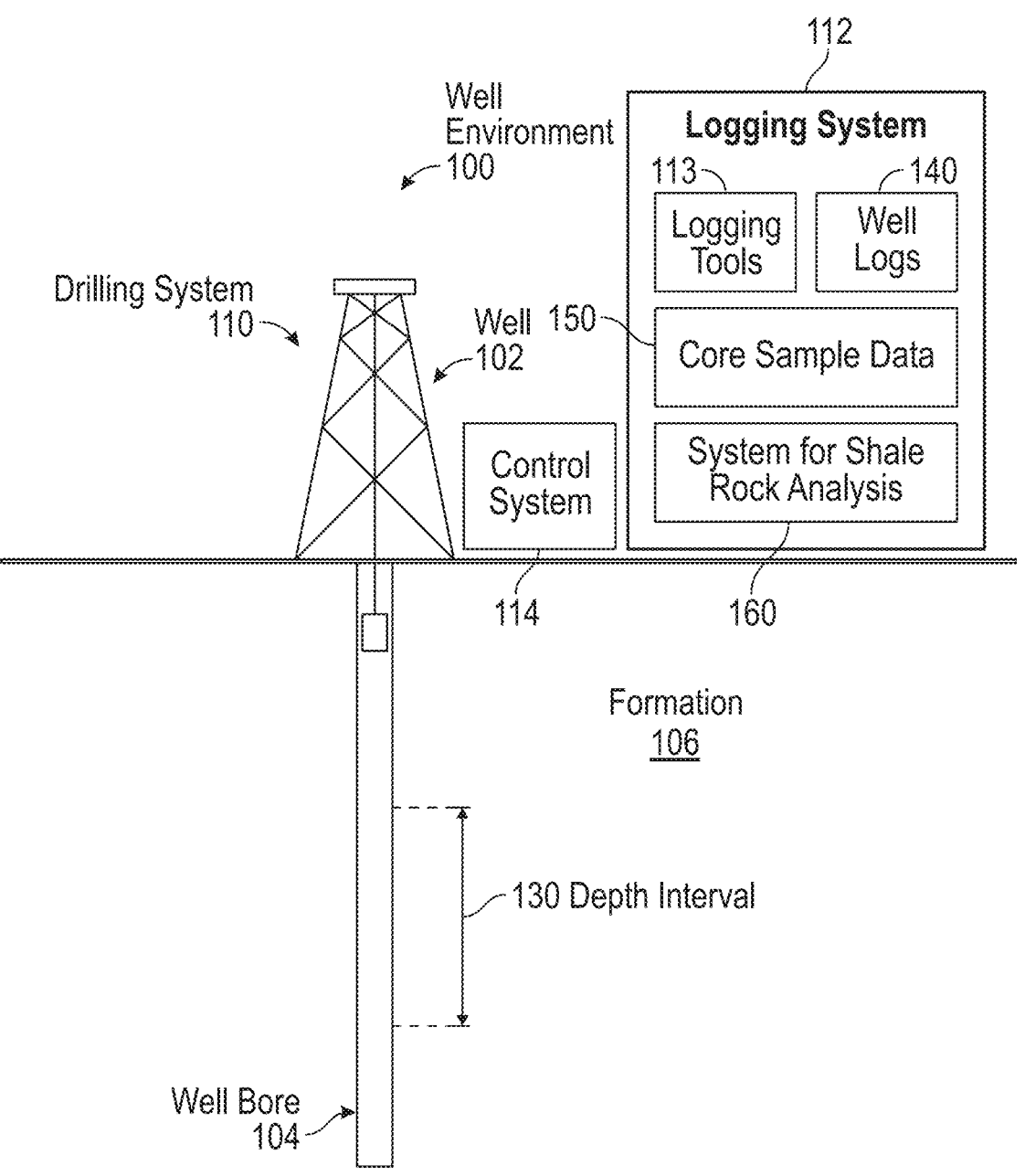
FIG. 1 shows a well environment in accordance with one or more embodiments.

Turning to FIG. 1, FIG. 1 shows a schematic diagram in accordance with one or more embodiments. FIG. 1 illustrates a well environment (100) that may include a well (102) having a wellbore (104) extending into a formation (106). The wellbore (104) may include a bored hole that extends from the surface into a target zone of the formation (106), such as a hydrocarbon reservoir ("reservoir"). The formation (106) may include various formation characteristics of interest, such as formation porosity, formation permeability, resistivity, density, water saturation, and the like. The formation (106) may be a hydrocarbon-bearing formation with shale rock. The suitability of the hydrocarbon-bearing formation for hydrocarbon production may depend on various parameters, including the maturity of the shale rock.

Keeping with FIG. 1, the well environment (100) may include a logging system (112) and various well systems, such as a drilling system (110), a control system (114), and a well completion system (not shown). The drilling system (110) may include a drill string, drill bit, a mud circulation system and/or the like for use in boring the wellbore (104) into the formation (106). The control system (114) may include hardware and/or software for managing drilling operations and/or maintenance operations. For example, the control system (114) may include one or more programmable logic controllers (PLCs) that include hardware and/or software with functionality to control one or more processes performed by the drilling system (110). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a data acquisition and monitoring system that is used to acquire equipment data and to monitor one or more well operations, or a well interpretation software system that is used to analyze and understand well events, such as drilling progress.

The logging system (112), in one or more embodiments, includes hardware and/or software supporting logging operations. For example, the logging system may include one or more logging tools (113) that may be used to generate, store, and/or analyze well logs (140), as described below. The logging system (112) may further include a system for shale rock analysis (160) which may provide core sample data (150), e.g., quantifying the maturity of the shale rock.

While the logging system (112) is shown at a well site, in some embodiments, one or more components of the logging system (112) may be remote from a well site. In some embodiments, the logging system (112) and/or a user device coupled to one or more components of the logging system (112) may include a computer system that is similar to the computer system (502) described below with regard to FIG. 5 and the accompanying description.

Turning to examples of logging techniques, multiple types of logging techniques are available for determining various reservoir characteristics. Logging may be based on measurements made by instruments lowered into the wellbore and/or based on inspection of samples brought to the surface. In some embodiments, coring is used as a logging technique.

Figure 2:
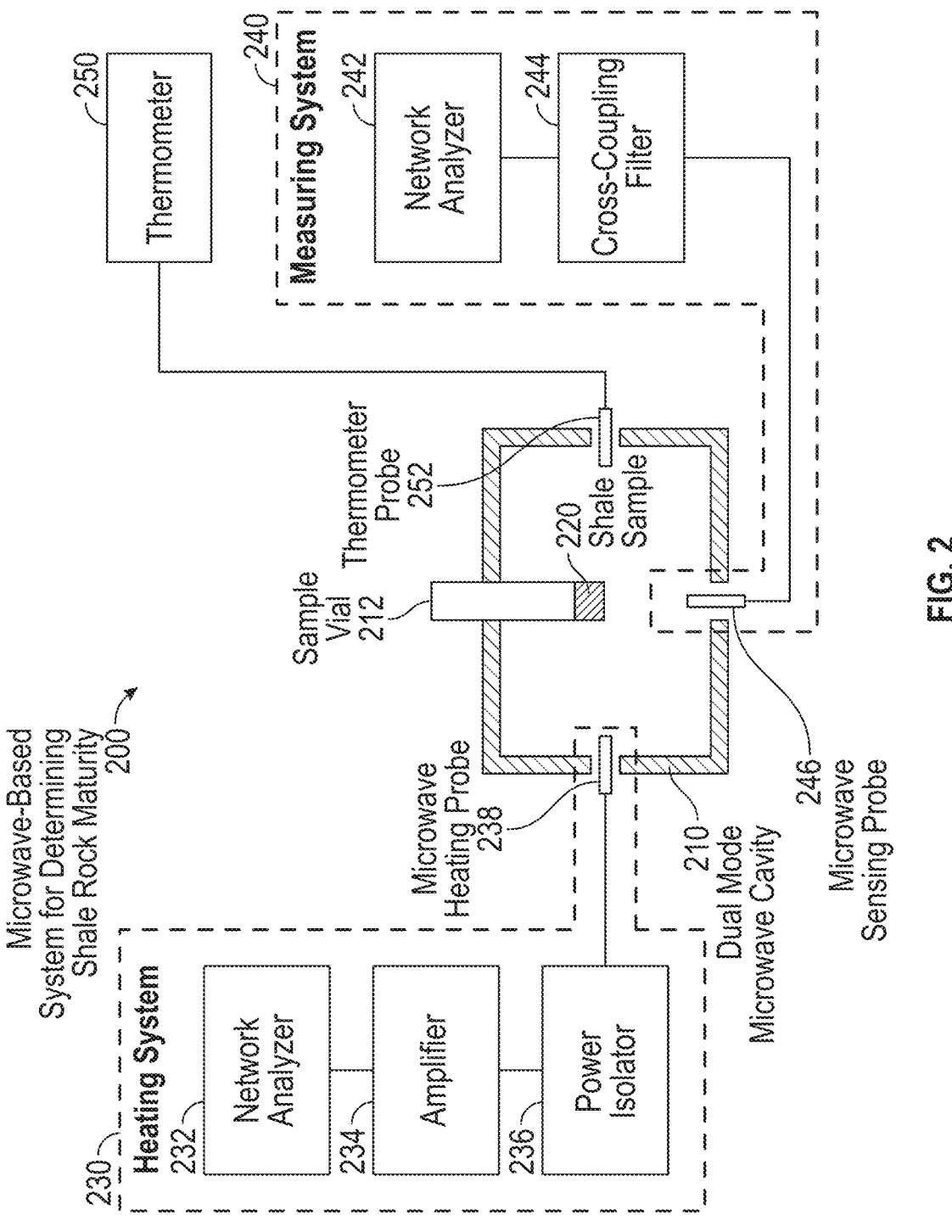
FIG. 2 shows a microwave-based system for determining shale rock maturity in accordance with one or more embodiments

Turning to coring, reservoir characteristics may be determined using core sample data (e.g., core sample data (150)) acquired from a well site and brought to the surface. For example, certain reservoir characteristics such as the maturity of the shale rock can be determined via coring (e.g., physical extraction of rock specimens) to produce core specimens and/or logging operations (e.g., wireline logging, logging-while-drilling (LWD) and measurement-while-drilling (MWD)). Coring operations may include physically extracting a rock specimen from a region of interest within the wellbore (104) for detailed analysis by the system for shale rock analysis (160). For example, when drilling an oil or gas well, a coring bit may cut core plugs (or "cores" or "core specimens" or "core samples") from the formation (106) and bring the core plugs to the surface, and these core specimens may be analyzed at the surface (e.g., by a system as shown in FIG. 2) to determine various characteristics of the formation (106) at the location where the specimen was obtained. For example, the maturity of shale rock may be determined.

Turning to various coring technique examples, conventional coring may include collecting a cylindrical specimen of rock from the wellbore (104) using a core bit, a core barrel, and a core catcher. The core bit may have a hole in its center that allows the core bit to drill around a central cylinder of rock. Subsequently, the resulting core specimen may be acquired by the core bit and disposed inside the core barrel. More specifically, the core barrel may include a special storage chamber within a coring tool for holding the core specimen. Furthermore, the core catcher may provide a grip to the bottom of a core and, as tension is applied to the drill string, the rock under the core breaks away from the undrilled formation below coring tool. Thus, the core catcher may retain the core specimen to avoid the core specimen falling through the bottom of the drill string.

Further, a logging tool (113) may be lowered into the wellbore (104) to acquire measurements as the tool traverses a depth interval (130) (e.g., a targeted reservoir section) of the wellbore (104). The plot of the logging measurements versus depth may be referred to as a "well log". Well logs (140) may provide depth measurements of the well (104) that describe such reservoir characteristics as formation porosity, formation permeability, resistivity, water saturation, and the like. The resulting logging measurements may be stored and/or processed, for example, by the control system (114), to generate corresponding well logs for the well (102). A well log (140) may include, for example, a plot of a logging response time versus true vertical depth (TVD) across the depth interval (130) of the wellbore (104).

Turning to FIG. 2, a microwave-based system for determining shale rock maturity (200), in accordance with one or more embodiments, is shown. The system (200) may be used to perform the operations shown in FIG. 3 in order to determine shale rock maturity.

The system (200) as shown includes a dual mode microwave cavity (210), a shale sample (220), a heating system (230), a measuring system (240), and a thermometer (250). Each of these components is subsequently described. In one or more embodiments, the components provide a dual microwave source calorimeter that may be brought to the field for in situ measurements.

The system (200) may be configured to measure the complex permittivity of the shale sample (220).

The dual mode microwave cavity (210), in one or more embodiments, is configured to allow a simultaneous heating and measuring of the shale sample (220) using two different microwave sources. More specifically, the microwave cavity (210), in one or more embodiments, is designed to have two dominant modes. One of the modes is used for heating the sample (220), and the other mode is used for simultaneously measuring the dielectric properties of the sample (220). The geometry of the dual mode microwave cavity (210) may be specific to the two modes. For example, based on the two modes as discussed below, the dual mode microwave cavity (210) may have a cylindrical shape with a diameter (horizontal direction in FIG. 2) of 104.92 mm and a height (vertical direction in FIG. 2) of 85 mm to avoid other disturbing modes. To prevent thermal expansion of the dual mode microwave cavity (210) during operation, the metal walls of the cavity may be cooled, e.g., by a water cooling system. The dimensions and positions of access holes in the cavity (e.g., for heating and measuring probes) may be designed to ensure that they do not disturb the fields or resonances of both modes, and to prevent microwave leakage.

The shale sample (220), in one or more embodiments, is a sample of the shale rock to be analyzed for maturity. The shale sample (220) may be obtained from a core plug brought to the surface from the formation as previously described in reference to FIG. 1. The shale sample (220) may be cylinder-shaped, and may have a diameter of, for example, 9.8 mm and a height of 15 mm. The shale sample (220) may be held by a sample vial (212) which may have an inner diameter of 10 mm and a height of 120 mm. The sample vial (212) and the shale sample (220) in the sample vial may have a different size or geometry, without departing from the disclosure. The sample vial (212) may be a quartz vial to ensure heat resistance across the temperature range used for testing the shale sample (220) such that measurements are not affected. The sample vial (212) may be inserted into the dual mode microwave cavity (210) through a cutoff hole located centrally in the top wall of the dual mode microwave cavity (210). In one or more embodiments, the sample vial (212) positions the shale sample (220) at a location where both modes exhibit a strong and uniform electric field.

The heating system (230), in one or more embodiments, is used to heat the shale sample (220) to a range of different temperatures. Microwave emissions may be used to heat the shale sample (220).

A network analyzer (232) or any other type of microwave signal source may be used as a signal generator for generating the microwave emissions for the heating mode. A signal with a frequency of approximately 2.45 GHz, e.g., 2.432 GHz, may be generated for the heating mode. The frequency may be specific to the dual mode microwave cavity (210) and may be determined based on the resonance frequencies of the dual mode microwave cavity.

An amplifier (234), e.g., a solid state amplifier, may be used to amplify the microwave signal from the network analyzer (232) to provide sufficiently powerful microwave emissions for heating the shale sample (220) to the desired temperature. A maximum power of, for example, 150 W, may be provided.

A power isolator (236) may be used to protect the amplifier (234) and/or the network analyzer (232) against reflections from the dual mode microwave cavity (210).

The microwave heating probe (238), e.g., a coaxial probe, may be used to provide the microwave emissions inside the dual mode microwave cavity (210). The microwave heating probe (238) may be inserted through a small hole in the lateral wall of the dual mode microwave cavity (210). The insertion depth may be adjustable.

During operation, the heating system (230) may produce a transverse electric (TE) $TE_{111}$ mode resonance inside the dual mode microwave cavity (210) based on the selected frequency of the microwave signal and the geometry of the dual mode microwave cavity (210).

In order to heat the shale sample (220) in a controlled manner, the temperature of the shale sample (220) may be monitored by the thermometer (250). The thermometer (250) may be an IR radiation thermometer with a thermometer probe (252) inserted into the dual mode microwave cavity (210) through a small hole in the lateral wall. A particular temperature profile over time may be accomplished by manually or automatically regulating the heating system (230) based on temperature measurements obtained using the thermometer (250).

The measuring system (240), in one or more embodiments, is used to measure the complex permittivity of the shale sample (220) over a range of temperatures. The complex permittivity may change based on the changing geochemical properties caused by the heating, thereby causing a change in resonances inside the dual mode microwave cavity (210). Based on the change in resonances, the complex permittivity may be determined, which then may serve as an indicator of characteristics of the shale sample (220), including its maturity. Specifically, when an AC field (a microwave signal provided by the measuring system (240)) is applied to the shale sample (220), the polarization of molecules of the shale sample (220) is out of phase with the AC field. Accordingly, the measured complex permittivity includes real ($\varepsilon'$) and imaginary ($\varepsilon''$) parts that exhibit frequency dependence. Using a resonance-based method based on the dual mode microwave cavity (210), the complex permittivity may be determined by first measuring the resonant frequency and quality factor (q-factor) of the empty dual mode microwave cavity (210) (in absence of the shale sample (220)), followed by measurements when the shale sample is present. Using this method, the complex permittivity of the shale sample (220) may be computed using the frequency and q-factor.

$\varepsilon'$ of the complex permittivity, also known as the dielectric constant, is a measure of the amount of energy from an external electrical field stored in the shale sample (220). $\varepsilon''$ of the complex permittivity, also known as the loss factor, quantifies the ability of the shale sample (220) to dissipate the absorbed energy of the external electrical field, e.g., by converting it into heat. It is zero for lossless materials. At a given frequency, $\varepsilon''$, leads to absorption loss if it is positive and gain if it is negative. With different substances having different $\varepsilon''$ vs temperature characteristics, presence of different substances may be determined based on an assessment of $\varepsilon''$ over a temperature range. The shale sample (220) can, thus, be classified according to its complex-valued permittivity $\varepsilon$.

The network analyzer (242) may be used as a signal generator for generating the microwave signal emitted into the dual mode microwave cavity (210) for the measuring mode. The microwave signal may have a frequency of, for example, 2.187 GHz. Other frequencies, e.g., in the range of 1.8-2.2 GHz may be used without departing from the disclosure. The network analyzer (242) may further include a receiver to measure the microwave signal in the dual mode microwave cavity (210). Comparison of the received microwave signal with the emitted microwave signal allows determination of $\varepsilon$.

The microwave sensing probe (246), e.g., a coaxial probe, may be used to emit and receive the microwave sensing signals. The microwave sensing probe (246) may enter the dual mode microwave cavity (210) at the center of the bottom wall.

During operation, the measuring system (240) may operate using a transverse magnetic (TM) $TM_{010}$ mode resonance inside the dual mode microwave cavity (210) based on the selected frequency of the microwave signal and the geometry of the dual mode microwave cavity (210).

One or more embodiments include a cross-coupling filter (244) to block the heating mode at 2.432 GHz from interfering with the sensing of the measuring system (240) at 2.187 GHz.

While FIG. 2 shows a configuration of hardware components and/or software components, other configurations may be used without departing from the scope of the disclosure. For example, the dual mode microwave cavity may have a different geometry, different frequencies may be used for the heating and/or sensing, etc. In one embodiment, the size of the dual mode microwave cavity is modified to operate the dual microwave cavity at a different frequency. The modification may be made for any frequency up to, for example, 10 GHz. Also, the frequency used for measuring the sample may be selected to be more distant to the frequency used for heating the sample. The modified cavity may accommodate samples of a size as previously described or samples of a different size, e.g., smaller samples. Further, in one embodiment, the dual mode microwave cavity is equipped with a Raman spectrometer. To improve the accuracy of the Raman spectrometer, the inside walls of the cavity may be covered with a black light-absorbent coating. In comparison to an aluminum surface, the black coating may reduce the reflections inside the cavity. In one embodiment, the cavity includes a pedestal to support the sample. The sample may be disposed on the pedestal, instead of entering through the top wall via a cutoff hole. The cavity may be sealed after placement of the sample on the pedestal. The pedestal may have dimensions according to the sample size. For example, for a sample with a diameter of 9.8 mm and a height of 15 mm, the pedestal may have a diameter of 9.8 mm and a height appropriate to center the sample in the cavity. Various components in FIG. 1 may be combined to create a single component. As another example, the functionality performed by a single component may be performed by two or more components.

Figure 3:
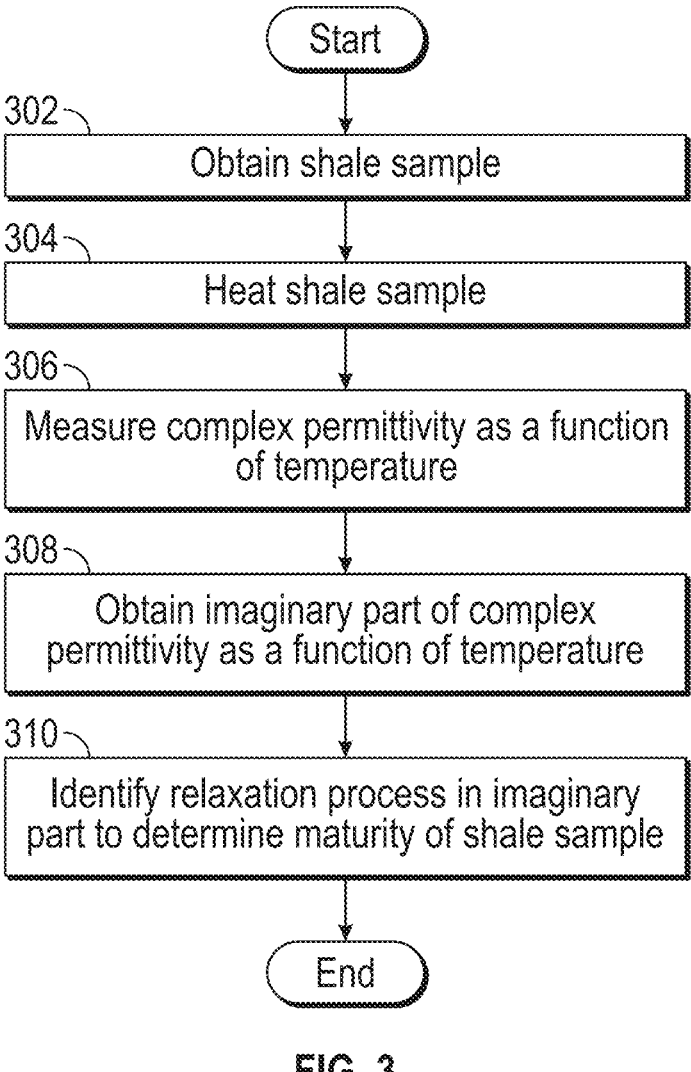
FIG. 3 shows an example of a dielectric characteristics-based shale analysis flowchart for a method in accordance with one or more embodiments.

FIG. 3 shows a flowchart in accordance with one or more embodiments, including operations performed to determine shale rock maturity using microwaves.

One or more blocks in FIG. 3 may be performed using a system as described in FIG. 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 302, a shale sample is obtained. The shale sample may be obtained as described in reference to FIG. 1. For example, the shale sample may be obtained from a core plug. The shale sample may be processed to fit into a sample vial. The shale sample may be placed into the sample vial, and the sample vial may be disposed into a dual mode microwave cavity as shown in FIG. 2.

In Block 304, the shale sample may be heated. The heating may involve activating a heating system. The heating system may generate microwave emissions that produce a transverse electric (TE) resonance, e.g., a $TE_{111}$ mode resonance inside the dual mode microwave cavity. Other types of resonances may be used without departing from the disclosure. The heating may be performed to obtain a heating of the shale sample according to a temperature profile over time. For example, the temperature increase may follow a ramp. The temperature may be increased to up to, for example, 600° C. Depending on the shale sample a temperature above 300° C. may be reached in less than 5 minutes. In one embodiment, the temperature profile specifies a continuously increasing temperature that is set prior to the measurement. For example, a rate may be set to 0.5° C. per second.

To ensure a controlled heating, the temperature of the shale sample may be monitored. An IR radiation thermometer may be used to monitor the temperature, and to adjust the heating, if necessary.

In Block 306, the complex permittivity, $\varepsilon$, of the shale sample is measured as a function of temperature. More specifically, as the temperature of the shale sample is increased within a range of temperatures over time, permittivity measurements are performed. The range of temperatures may be, for example, 200° C.-600° C., or any other temperature range. The measuring may occur simultaneously with the heating as described in reference to FIG. 2.

Figure 4A:
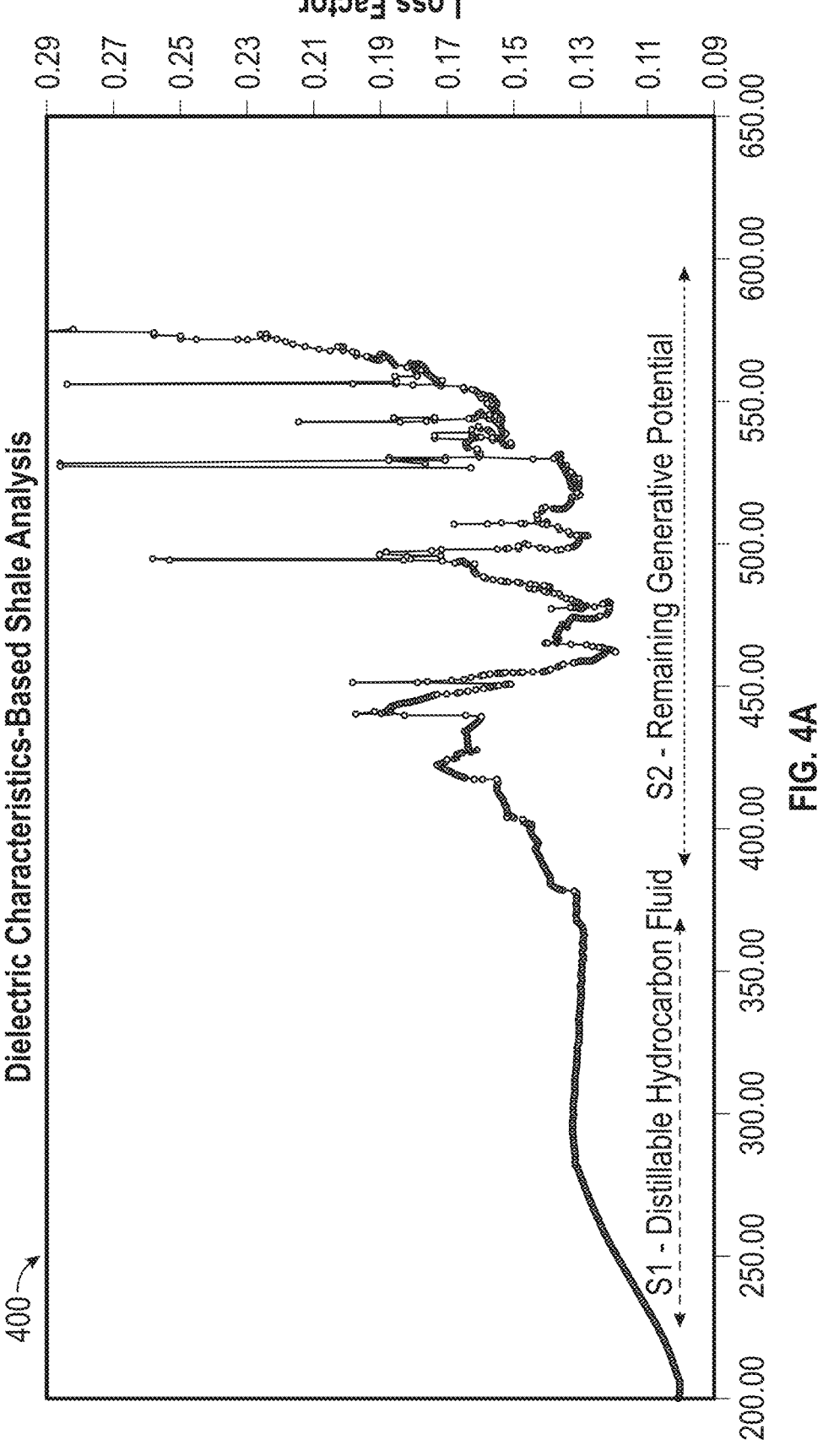
FIG. 4A shows an example of a dielectric characteristics-based shale analysis in accordance with one or more embodiments.

In Block 308, the complex permittivity is separated into real ($\varepsilon'$) and imaginary ($\varepsilon''$) parts. An example of $\varepsilon''$ plotted over a range of temperatures is shown in FIG. 4A.

In Block 310, relaxation processes in the imaginary part of $\varepsilon$ are identified to determine the maturity of the shale sample. A maximum of the imaginary part for a specific frequency (the relaxation frequency) is considered to be associated with a relaxation process. The relaxation frequency may depend on the temperature of the material, rock, fluid, etc., that is been measured. Since different materials relax at different frequencies for different temperatures, relaxation processes allow the identification of components of the material, from a set of likely components. The detection of the relaxation process may be performed by visual inspection of a plot of $\varepsilon''$ by a user. An example is provided in FIG. 4A. Alternatively, the detection of the relaxation process may be automated. Referring now to the determination of maturity, the imaginary part of $\varepsilon$ may exhibit a small relaxation process at a particular temperature. This temperature may coincide with the first mobility temperature of oil. While maturity may be commonly determined using the vitrinite reflectance (quantified using % Ro) measured from the surface of vitrinite macerals found in source rocks, this may not always be possible. For example, due to the absence of vitrinite in marine source rocks, other methods may need to be used. Pyrolysis is one method to obtain an equivalent. Using the previously described S1 and S2 values, the productivity index, PI=S1/(S1+S2), an equivalent to % Ro may be obtained. As previously discussed, S1 and S2 may also be obtained from the imaginary part of the permittivity. Accordingly, the microwave-based approach as described may also provide an equivalent to vitrinite reflectance, serving as an indicator for maturity.

Figure 4B:
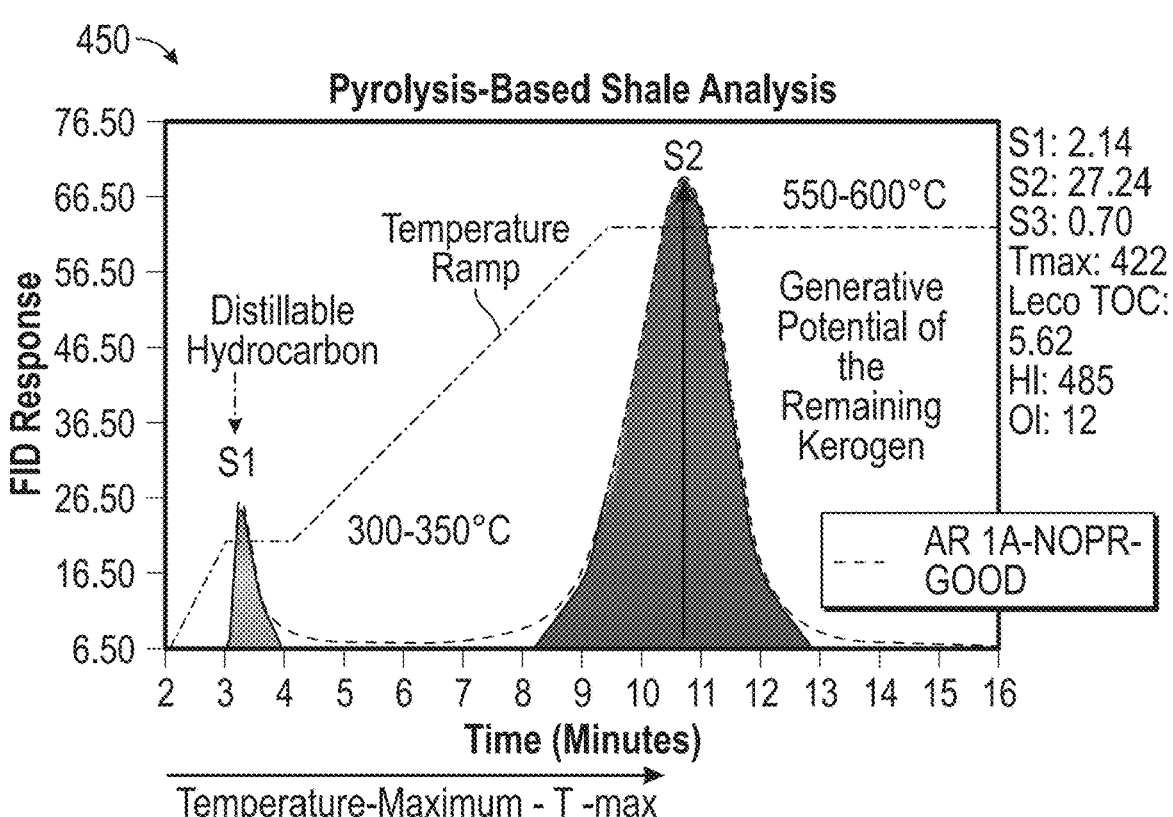
FIG. 4B shows an example of a pyrolysis-based shale analysis for comparison.

Specifically comparing the microwave-based approach to the pyrolysis-based approach, the permittivity loss factors and the temperatures at which they occur is equivalent to PI. Referring to the examples shown in FIGS. 4A and 4B, the temperature where S1 is produced during pyrolysis is between 200-350° C. (FIG. 4B). A comparable amplitude in the loss factor also occurs from 200-350° C. (FIG. 4A) which is related to the fluid hydrocarbons distilling from the rock at Ls1. Similar to how S2 in pyrolysis is related to the generative potential in kerogen, recorded at 400-600° C., the dielectric loss factor is significant at Ls2. Accordingly, the ratio Ls1/(Ls1+Ls2) may serve as a proxy productivity index related to maturity. For example, if the obtained PI is in the range of 0.10, (equivalent % Ro of 0.65) it would be considered early maturity; if the obtained PI is in the range of 0.25 (equivalent % Ro of 0.83), then the rock may be classified as being of peak maturity; whereas a value in the range of 0.40 (equivalent % Ro of 1.3) may indicate condensate maturity. While the above is based on intensities of $\varepsilon''$, a potentially more accurate ratio may be obtained using the area under the curves.

Continuing with the discussion of Block 310, the maturity may be determined using the ratio Ls1/(Ls1+Ls2). Alternatively, the maturity may be determined using a machine learning model. The machine learning model may operate on $\varepsilon''$ to estimate the maturity. Any type of machine learning model, for example, an artificial neural network, may be used. The machine learning model may have been trained using training sets from samples from the same field whose maturity has been determined using other methods, e.g., vitrinite reflectance.

While the above description is for determining maturity of a shale sample based on $\varepsilon''$, other parameters that may be extracted from the relaxation process, without departing from the disclosure.

The following discussion provides a comparison of results obtained using methods in accordance with one or more embodiments and results obtained using a pyrolysis-based analysis.

Turning to FIG. 4A, an example of a dielectric characteristic-based shale analysis (400), in accordance with one or more embodiments, is shown. The dielectric characteristic-based shale analysis (400) shows the imaginary ($\varepsilon''$) part of the permittivity (loss factor) over a temperature range, as it may have been obtained using the system of FIG. 2 and the method of FIG. 3. In the example, $\varepsilon''$ values are obtained for a temperature range of 200° C. to slightly below 600° C. A first relaxation process, identified as described in Block 310 of the method, may be detected at a temperature of somewhat below 300° C. (minor bump, followed by plateau in $\varepsilon''$).

Turning to FIG. 4B, a pyrolysis-based shale analysis (450), is shown for comparison. Although the graphs of FIG. 4A and FIG. 4B show different data for different variables, a qualitative comparison may be made. Beginning with the discussion of FIG. 4B, a shale sample of known mass is heated in a sealed oven, according to a prescribed rate of increasing temperatures that terminates at, for example, 650° C. or higher temperatures. As the combustion of the sample commences, the gases from the sample emitted at different temperatures, are carried either by a stream of nitrogen or helium to different detectors which are reached by mechanically splitting the stream to direct part of the gas to a flame ionization detector (FID) to measure hydrogen and the other to a thermal conductivity detector to measure the carbon dioxide evolved in the process. Thus, both the amount of H2 and CO2 are recorded as the temperature increases. As illustrated in the graph of FIG. 4B, during the initial heating, upon reaching a temperature threshold of, for example, 300-350° C., a significant amount of hydrogen is recorded which originates from the combustion of the distillable hydrocarbon in the rock. The amount of distillable hydrocarbon that was originally generated by the kerogen depends upon its stage of transformation and results in the "S1" peak, shown in FIG. 4B. Integration of the area under the "S1" peak may provide the total distillable hydrocarbon measured.

With further increases in temperature, e.g., beyond 350° C., another threshold is reached at 550-600° C., where yet more hydrogen is obtained from the rock. An "S2" peak, also shown in FIG. 4B, may be recorded for the hydrocarbon that would be generated if the remaining hydrocarbon generative potential of the kerogen for a given stage of transformation was converted into hydrocarbons. Integration of the area under the "S2" peak may provide the total generative potential of the remaining kerogen.

A qualitative estimate of the maturity may be obtained based on the ratio of S1 and S2. For example, the ratio S1/(S1+S2) can be used to compute a productivity index (PI). Thresholds may be used to distinguish between early maturity, peak maturity, and late maturity. For example, PI=0.1 may be considered early maturity, PI=0.25 may be considered peak maturity, and PI=0.40 may be considered late maturity.

Now referring to FIG. 4A, showing the dielectric loss, $\varepsilon''$, while the sample is being heated via microwaves, the dielectric losses recorded relative to temperature that occur in the range of 200-350° C. are qualitatively comparable to that of S1 obtained using the pyrolysis-based approach. Further, at 400-600° C. a result that is qualitatively comparable to the S2, can be observed. Thus, the area under curve of both methods may provide qualitatively comparable results that may be used to establish a productivity index, which may then be used to determine maturity.

In the case of the sample analyzed using pyrolysis (FIG. 4B), its productivity index is less than 0.1 meaning its S2 value is far greater than its S1 value. Similarly, in case of the sample analyzed using dielectric characteristics, the sum of the dielectric losses recorded for temperatures from 200-350° C. is far less than that of the losses recorded between 400-600° C., reflecting the maturity of the sample which is considered to be in an early stage of oil maturity.

Figure 5:
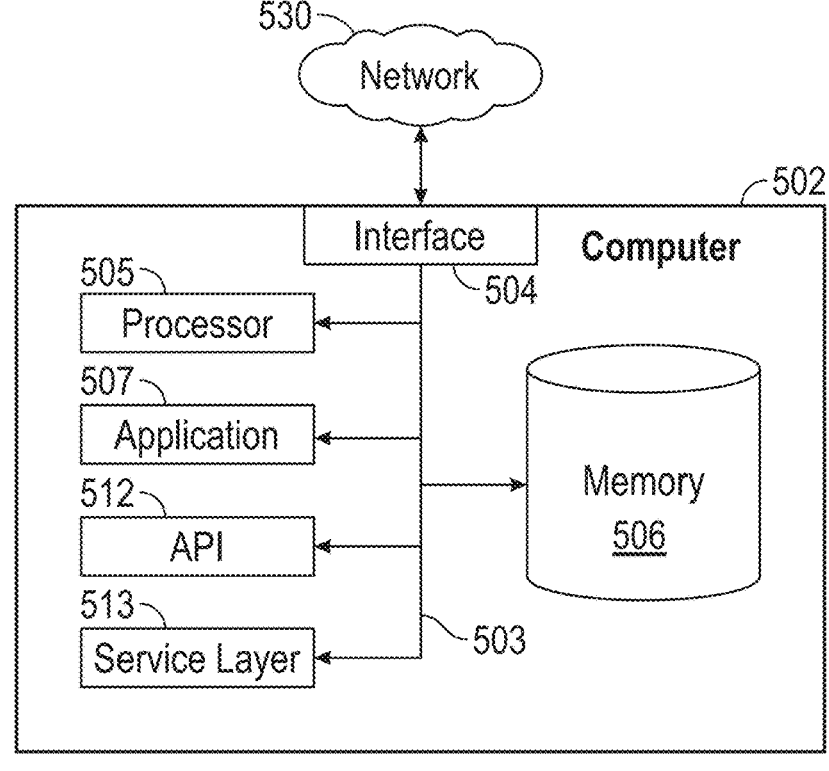
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or another suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, a cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A system for determining shale rock maturity, the system comprising:
   a dual mode microwave cavity configured to receive a shale sample obtained from a geological formation;
   a heating system configured to heat the shale sample to a range of different temperatures using microwave emissions of a first frequency;
   a measuring system configured to measure a complex permittivity of the shale sample using a microwave signal of a second frequency; and
   a processor configured to:
      obtain an imaginary part of the complex permittivity; and
      determine the shale rock maturity based on a relaxation in the imaginary part, comprising:
         identifying a maximum S1 in a first temperature range and a maximum S2 in a second temperature range higher than the first temperature range;
         computing a ratio S1/(S1+S2) to obtain a productivity index; and
         evaluating the productivity index to obtain the shale rock maturity,
      wherein the shale rock maturity is used to determine a viability of the geological formation,
         informing operation of a drilling system for production of hydrocarbons from the geological formation.

2. The system of claim 1, further comprising a sample vial insertable into the dual mode microwave cavity,
   wherein the sample vial is configured to hold the shale sample.

3. The system of claim 1, further comprising a thermometer, configured to monitor the heating of the shale sample.

4. The system of claim 1, wherein the dual mode microwave cavity is cylindrical.

5. The system of claim 1, wherein the microwave emissions of the heating system establish a resonant $TE_{111}$ mode inside the dual mode microwave cavity.

6. The system of claim 1, wherein the microwave signal of the measuring system establishes a resonant $TM_{010}$ mode inside the dual mode microwave cavity.

7. The system of claim 1,
   wherein the measuring system comprises a cross-coupling filter configured to attenuate at the first frequency.

8. A method for determining shale rock maturity, the method comprising:
   measuring a complex permittivity of a shale sample obtained from aa geological formation as a function of temperature;
   obtaining an imaginary part of the complex permittivity; and
   determining the shale rock maturity based on a relaxation in the imaginary part, comprising:
      identifying a maximum S1 in a first temperature range and a maximum S2 in a second temperature range higher than the first temperature range;
      computing a ratio S1/(S1+S2) to obtain a productivity index; and
      evaluating the productivity index to obtain the shale rock maturity,
   wherein the shale rock maturity is used to determine a viability of the geological formation,
      informing operation of a drilling system for production of hydrocarbons from the geological formation.

9. The method of claim 8, wherein measuring the complex permittivity of the shale sample comprises:
   obtaining the shale sample;
   heating the shale sample; and
   recording the complex permittivity during the heating.

10. The method of claim 9, wherein obtaining the shale sample comprises:
    extracting the shale sample from a core plug obtained from a well.

11. The method of claim 9, wherein heating the shale sample comprises:
    generating microwave emissions; and
    exposing the shale sample to the microwave emissions.

12. The method of claim 9, wherein heating shale sample comprises:
    heating the shale sample according to a temperature profile specifying a continuously increasing temperature.

13. The method of claim 8, wherein measuring the complex permittivity comprises:
    measuring the complex permittivity using a microwave signal.

14. The method of claim 8, wherein determining the shale rock maturity based on the relaxation in the imaginary part further comprises:
    processing the imaginary part by a machine learning model to obtain the shale rock maturity.

15. The method of claim 14, further comprising:
    training the machine learning model based on samples of known maturity.

16. A non-transitory machine-readable medium comprising a plurality of machine-readable instructions executed by one or more processors, the plurality of machine-readable instructions causing the one or more processors to perform operations comprising:
    determining a shale rock maturity of a shale sample obtained from a geological formation based on a relaxation in an imaginary part of a complex permittivity, comprising:
       identifying a maximum S1 of the imaginary part in a first temperature range and a maximum S2 of the imaginary part in a second temperature range higher than the first temperature range;
       computing a ratio S1/(S1+S2) to obtain a productivity index; and
       evaluating the productivity index to obtain the shale rock maturity, wherein the complex permittivity of the shale sample is a function of a temperature of the shale sample, and wherein the shale rock maturity is used to determine a viability of the geological formation, informing operation of a drilling system for production of hydrocarbons from the geological formation.

17. The non-transitory machine-readable medium of claim 16, wherein determining the shale rock maturity based on the relaxation in the imaginary part further comprises:

processing the imaginary part by a machine learning model to obtain the shale rock maturity.

* * * * *